(12) United States Patent
Wang et al.

(10) Patent No.: US 12,463,748 B2
(45) Date of Patent: Nov. 4, 2025

(54) DATA RECEIVING APPARATUS AND METHOD HAVING BLIND DECONVOLUTION MECHANISM

(71) Applicant: REALTEK SEMICONDUCTOR CORPORATION, Hsinchu (TW)

(72) Inventors: Feng-Xiang Wang, Shanghai (CN); Ming-Yue You, Qinhuangdao (CN); Jyun-Wei Pu, Hsinchu County (TW); Jia-Yi Zhuang, Shanghai (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 326 days.

(21) Appl. No.: 18/210,838

(22) Filed: Jun. 16, 2023

(65) Prior Publication Data
US 2024/0121028 A1    Apr. 11, 2024

(30) Foreign Application Priority Data
Sep. 30, 2022   (CN) .......................... 202211210938.7

(51) Int. Cl.
*H04L 1/00*   (2006.01)
*H04L 25/03*  (2006.01)

(52) U.S. Cl.
CPC .......... *H04L 1/0059* (2013.01); *H04L 1/0038* (2013.01); *H04L 1/0054* (2013.01); *H04L 1/0071* (2013.01); *H04L 25/03866* (2013.01)

(58) Field of Classification Search
CPC ... H04L 1/0059; H04L 1/0038; H04L 1/0054; H04L 1/0071; H04L 25/03866; H04L 1/1845; H04L 1/1812
See application file for complete search history.

(56) References Cited

U.S. PATENT DOCUMENTS

| 11,290,132   | B1  | 3/2022 | Wang et al. |
| 2001/0003208 | A1  | 6/2001 | Wan |
| 2021/0127369 | A1* | 4/2021 | Ma ........................ H04L 5/0048 |

FOREIGN PATENT DOCUMENTS

| CN | 114448571 A | 5/2022 |
| TW | 202008734   | 2/2020 |

OTHER PUBLICATIONS

3GPP TS 36.212, "Evolved Universal Terrestrial Radio Access (E-UTRA); Multiplexing and channel coding", Clause 5.1.4.2, 2018, ETSI.

(Continued)

*Primary Examiner* — Iqbal Zaidi
(74) *Attorney, Agent, or Firm* — WPAT, PC

(57) ABSTRACT

The present disclosure discloses a data receiving apparatus and a data receiving method having blind deconvolution mechanism. A descrambling circuit descrambles received data according to an antenna assumption and N data position assumptions within a transmission period to generate N groups of soft-bit data. A soft-bit processing circuit retrieves bit position data to determine non-variable bit positions and variable bit positions. N circular buffers of a storage circuit store and superimpose the N groups of soft-bit data corresponding to N data position assumptions in a circular manner to generate N groups of superimposed results and keep the data corresponding to the non-variable bit positions. A post-processing circuit performs de-interleaving and decoding on the N groups of superimposed results to generate N groups of decoded results to perform redundancy check thereon. When one decoded results passes the redundancy check, the soft-bit processing circuit stops performing the blind deconvolution process.

18 Claims, 6 Drawing Sheets

(56) References Cited

OTHER PUBLICATIONS

3GPP TS 36.133, "Evolved Universal Terrestrial Radio Access (E-UTRA); Requirements for support of radio resource management", Clause 6.7.2, 2020, ETSI.

* cited by examiner

|  | SBD0 | SBD1 | SBD2 | SBD3 | SBD4 | SBD5 | SBD6 | SBD7 |
|---|---|---|---|---|---|---|---|---|
| 1st assumption | SBO0 | SBO1 | SBO2 | SBO3 | SBO4 | SBO5 | SBO6 | SBO7 |
| 2nd assumption | SBO1 | SBO2 | SBO3 | SBO4 | SBO5 | SBO6 | SBO7 | SBO0 |
| 3rd assumption | SBO2 | SBO3 | SBO4 | SBO5 | SBO6 | SBO7 | SBO0 | SBO1 |
| 4th assumption | SBO3 | SBO4 | SBO5 | SBO6 | SBO7 | SBO0 | SBO1 | SBO2 |
| 5th assumption | SBO4 | SBO5 | SBO6 | SBO7 | SBO0 | SBO1 | SBO2 | SBO3 |
| 6th assumption | SBO5 | SBO6 | SBO7 | SBO0 | SBO1 | SBO2 | SBO3 | SBO4 |
| 7th assumption | SBO6 | SBO7 | SBO0 | SBO1 | SBO2 | SBO3 | SBO4 | SBO5 |
| 8th assumption | SBO7 | SBO0 | SBO1 | SBO2 | SBO3 | SBO4 | SBO5 | SBO6 |

Fig. 4A

|     | DS0 | DS1 | DS2 | DS3 | DS4 | DS5 | DS6 | DS7 |
|-----|-----|-----|-----|-----|-----|-----|-----|-----|
| SD0 | SBO0 | SBO1 | SBO2 | SBO3 | SBO4 | SBO5 | SBO6 | SBO7 |
| SD1 | SBO1 | SBO2 | SBO3 | SBO4 | SBO5 | SBO6 | SBO7 | SBO0 |
| SD2 | SBO2 | SBO3 | SBO4 | SBO5 | SBO6 | SBO7 | SBO0 | SBO1 |
| SD3 | SBO3 | SBO4 | SBO5 | SBO6 | SBO7 | SBO0 | SBO1 | SBO2 |
| SD4 | SBO4 | SBO5 | SBO6 | SBO7 | SBO0 | SBO1 | SBO2 | SBO3 |
| SD5 | SBO5 | SBO6 | SBO7 | SBO0 | SBO1 | SBO2 | SBO3 | SBO4 |
| SD6 | SBO6 | SBO7 | SBO0 | SBO1 | SBO2 | SBO3 | SBO4 | SBO5 |
| SD7 | SBO7 | SBO0 | SBO1 | SBO2 | SBO3 | SBO4 | SBO5 | SBO6 |

Fig. 4B

DATA RECEIVING APPARATUS AND METHOD HAVING BLIND DECONVOLUTION MECHANISM

BACKGROUND OF THE INVENTION

1. Field of the Invention

The present disclosure relates to a data receiving apparatus and a data receiving method having blind deconvolution mechanism.

2. Description of Related Art

In the field of the low power wide area network, the demands of low power cost from the users increase. Especially in the applications of Internet of Things (IoT) in which a huge amount of user devices are connected to the network, some devices operate to perform low data amount transmission and idle for a long time. The devices need to perform blind deconvolution when data is received. When the blind deconvolution takes more time to be performed, more power is dissipated by the devices. As a result, it is beneficial to have a more efficiency and faster blind deconvolution mechanism to decrease the power cost of the devices.

SUMMARY OF THE INVENTION

In consideration of the problem of the prior art, an object of the present disclosure is to provide a data receiving apparatus and a data receiving method having blind deconvolution mechanism.

The present invention discloses a data receiving apparatus having blind deconvolution mechanism that includes a descrambling circuit, a storage circuit, a soft-bit processing circuit and a post-processing circuit. The descrambling circuit is configured to descramble received data received from an antenna according to an antenna assumption of the antenna and N data position assumptions within a transmission period to generate N groups of soft-bit data, wherein the received data is generated according to a convolution encoding process and includes N data sub-blocks within the transmission period, the N data position assumptions in turn assume that a first data sub-block of the received data is a first original data sub-block of original data to that the first data sub-block is an N-th original data sub-block of the original data. The storage circuit includes N circular buffers each having a unit encoding length. The soft-bit processing circuit is configured to retrieve bit position information corresponding to the unit encoding length to determine a plurality of non-variable bit positions and a plurality of variable bit positions to perform a blind deconvolution process that includes steps outlined below. The N groups of soft-bit data corresponding to the N data position assumptions are stored and superimposed in a circular manner to generate N groups of superimposed results by the N circular buffers of the storage circuit. Data corresponding to the non-variable bit positions is kept in the N circular buffers and data corresponding to the variable bit positions in the N circular buffers is cleared when a new assumed transmission period starts. The post-processing circuit is configured to perform de-interleaving and decoding on the N groups of superimposed results of each of data sub-blocks to generate N groups of decoded results to perform redundancy check thereon to generate N checked results. When any one group of the N groups of decoded results passes the redundancy check according to the N checked results, the soft-bit processing circuit outputs the group of decoded results that pass the redundancy check.

The present invention also discloses a data receiving method having blind deconvolution mechanism that includes steps outlined below. Received data received from an antenna is descrambled by a descrambling circuit according to an antenna assumption of the antenna and N data position assumptions within a transmission period to generate N groups of soft-bit data, wherein the received data is generated according to a convolution encoding process and includes N data sub-blocks within the transmission period, the N data position assumptions in turn assume that a first data sub-block of the received data is a first original data sub-block of original data to that the first data sub-block is an N-th original data sub-block of the original data. Bit position information corresponding to the unit encoding length is retrieved by a soft-bit processing circuit to determine a plurality of non-variable bit positions and a plurality of variable bit positions. A blind deconvolution process is performed by the soft-bit processing circuit that includes the steps outlined below. The N groups of soft-bit data corresponding to the N data position assumptions are stored and superimposed in a circular manner by using N circular buffers each having a unit encoding length included by a storage circuit to generate N groups of superimposed results by the soft-bit processing circuit. Data corresponding to the non-variable bit positions is kept in the N circular buffers and data corresponding to the variable bit positions in the N circular buffers is cleared when a new assumed transmission period starts. De-interleaving and decoding are performed on the N groups of superimposed results of each of data sub-blocks by a post-processing circuit to generate N groups of decoded results to perform redundancy check thereon to generate N checked results. The group of decoded results that pass the redundancy check are outputted by the soft-bit processing circuit when any one group of the N groups of decoded results passes the redundancy check according to the N checked results.

These and other objectives of the present disclosure will no doubt become obvious to those of ordinary skill in the art after reading the following detailed description of the preferred embodiments that are illustrated in the various figures and drawings.

BRIEF DESCRIPTION OF THE DRAWINGS

FIG. 4A illustrates different arrangements of the received data corresponding to different data position assumptions according to an embodiment of the present invention.

FIG. 4B illustrates a diagram of the soft-bit data according to an embodiment of the present invention.

DETAILED DESCRIPTION OF THE PREFERRED EMBODIMENTS

An aspect of the present invention is to provide a data receiving apparatus and a data receiving method having blind deconvolution mechanism to perform blind deconvolution according to the information of the accumulated data corresponding to the non-variable bit positions to shorten the processing time of the blind deconvolution.

Figure 1:
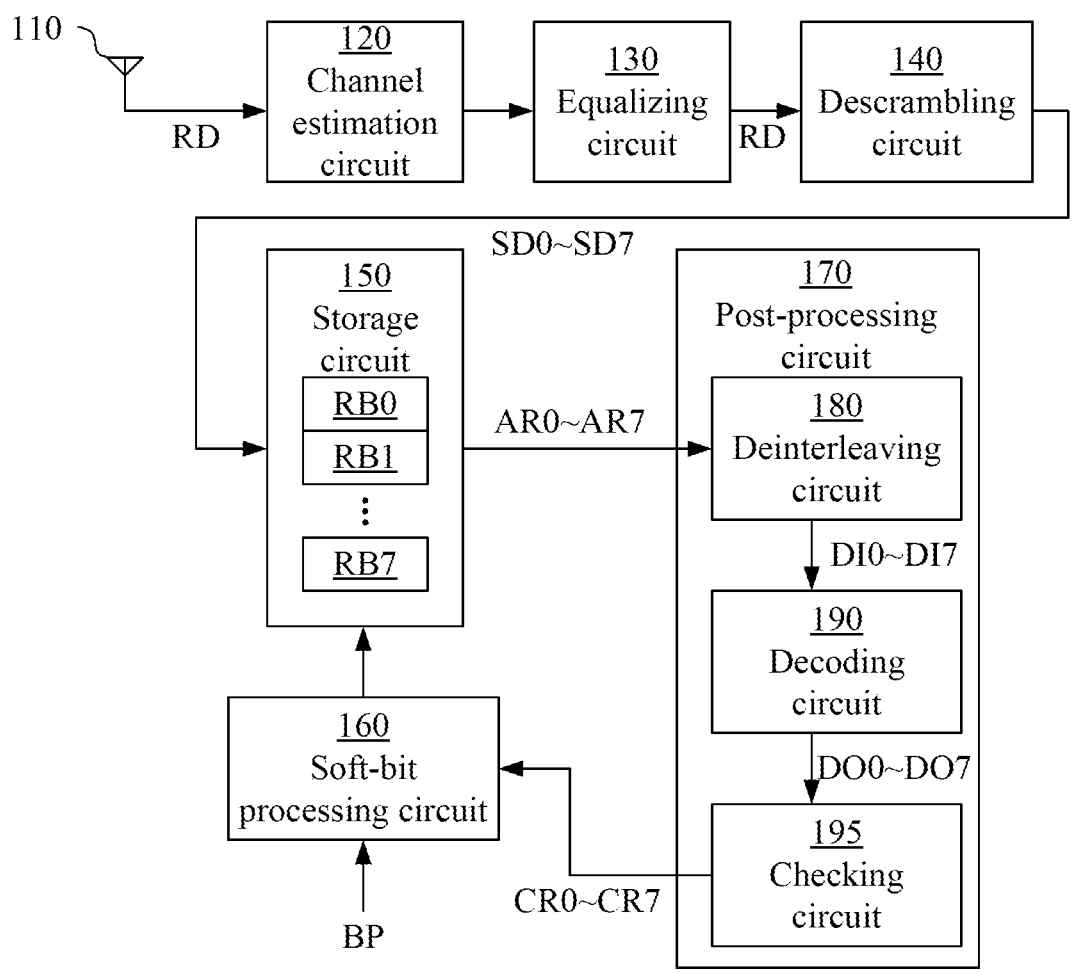
FIG. 1 illustrates a block diagram of a data receiving apparatus having blind deconvolution mechanism according to an embodiment of the present invention.

Reference is now made to FIG. 1. FIG. 1 illustrates a block diagram of a data receiving apparatus 100 having blind deconvolution mechanism according to an embodiment of the present invention.

The data receiving apparatus 100 may receive the received data RD from a data transmission apparatus (not illustrated in the figure) through such as, but not limited to a narrowband physical broadcast channel (NPBCH) or a narrowband physical downlink shared channel (NPDSCH) of a narrowband Internet of things (NB-IOT) system.

The received data RD can be generated by a convolution encoding process performed by the data transmission apparatus. The data receiving apparatus 100 starts to perform blind deconvolution on the received data RD once the received data RD is received.

Since the operation of the data receiving apparatus 100 is related to the convolution encoding process performed by the data transmission apparatus, the performance of the convolution encoding process is described first by using the encoding technology of tail-biting convolutional code (TBCC) as an example. However, the present invention is not limited to such an encoding technology.

Figures 2, 3:
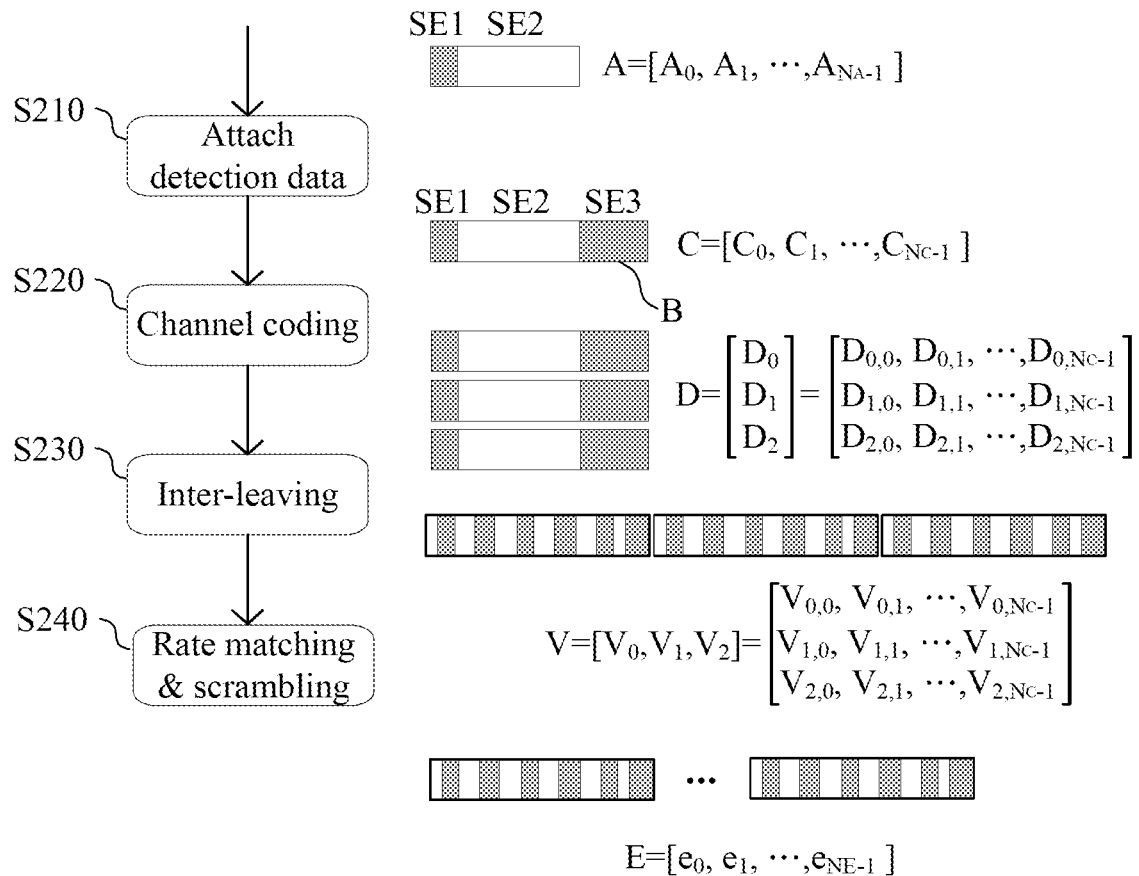
FIG. 2 illustrates a diagram of an encoding flow that encodes original data to generate encoded data according to an embodiment of the present invention.
FIG. 3 illustrates a diagram of the structure of the data under transmitted according to an embodiment of the present invention.

Reference is now made to FIG. 2. FIG. 2 illustrates a diagram of an encoding flow that encodes original data A to generate encoded data E according to an embodiment of the present invention.

As illustrated in FIG. 2, the original data original data A is a vector having a length of $N_A \times 1$, which includes $N_A$ bits of data and includes a first under-encoded bit section SE1 and a second under-encoded bit section SE2.

In a numerical example, the length of the first under-encoded bit section SE1 is 6 bits. The first under-encoded bit section SE1 includes such as, but not limited to 4 bits of system frame number (SFN) and 2 bits of hyper SFN. The contents thereof vary constantly in different periods and are variable bits. The length of the second under-encoded bit section SE2 is 28 bits. The contents thereof do not vary for a long period of time and are treated as non-variable bits. As a result, the number $N_A$ is 34.

In step S210, a third under-encoded bit section SE3, e.g., error detection data B having a length of $N_B$, is attached to the original data A through a check code attaching process to become data C having a length of $N_C$. The error detection data B can be implemented by such as but not limited to a cyclic redundant check (CRC) code to check the correctness of the original data A.

In an embodiment, the error detection data B is generated according to the calculation performed on the first under-encoded bit section SE1 and the second under-encoded bit section SE2, in which the contents thereof vary constantly in different periods and are variable bits. Under such a condition, $N_C = N_A + N_B$. In a numerical example, the length of the third under-encoded bit section SE3 is 16 bits. As a result, $N_C$ is 50.

In step S220, a channel encoding is performed on the data C to resist the channel effect.

In a embodiment, the data transmission apparatus may include registers having a number of L (e.g. 6) and adders. By using the components described above, the tail-biting convolutional code encoding technology can be implemented with such as 1/3 of encoding rate, to generate data D in a form of $3 \times N_C$ that can be represented by a vector $$\begin{bmatrix} D_0 \\ D_1 \\ D_2 \end{bmatrix}.$$

However, the encoding rate in the present invention is not limited thereto. As a result, after the encoding process, the data having the original length of 50 bits becomes the encoded data having the length of 150 bits, in which such a length of 150 bits is defined as a unit encoding length.

In a embodiment, the encoding is performed on the first under-encoded bit section SE1 (6 bits) and a first part (6 bits) of the second under-encoded bit section SE2 that is neighboring to the first under-encoded bit section SE1 and having the length equal to the register length L. For each of the three parts ($D_0$, $D_1$ and $D_2$) of the encoded data, the variable bits corresponding to the first under-encoded bit section SE1 (6 bits) and the second under-encoded bit section SE2 become 6+6=12 bits. The non-variable bits become 28-6=22. The variable bits corresponding to the third under-encoded bit section SE3 are still 16 bits.

In step S230, an interleaving process is performed on the data D.

In a embodiment, the NB-IOT system performs interleaving on the data D with the fixed interleaving algorithm, and performs the same interleaving process on the three parts of the data to generate one-dimensional data V having a length of $3N_C \times 1$ (still the unit encoding length of 150 bits) and can be represented by a vector $[V_0, V_1, V_2]$. For example, the section 5.1.4.2 of the document "Evolved Universal Terrestrial Radio Access (E-UTRA); Multiplexing and channel coding" defines an interleaving method that can be applied to the NB-IOT system.

Though the positions of the variable bits and the non-variable bits change due to the interleaving process and are not continuous anymore, the variable bit positions and the non-variable bit positions in the interleaved data among different periods are the same since the interleaving algorithm is fixed. Further, since the encoding and the interleaving are performed identical on three parts, the variable bits and the non-variable bits have corresponding positions in the three sub-vectors $V_0$, $V_1$ and $V_2$ each having a length of 50 bits. For example, when the 22 non-variable bits corresponding to the first sub-vector $V_0$ is represented as UnChangedPos_V=[U0, U1, . . . , U20, U21], the non-variable bits corresponding to the second sub-vector $V_1$ and the third sub-vector $V_2$ are UnChangedPos_V+50 and UnChangedPos_V+100 respectively. The three sub-vectors together have the non-variable bits of 66 bits.

In step S240, the data V is evenly mapped all usable units through rate-matching and scrambling to form data E for transmission with a length of $N_E \times 1$.

Reference is now made to FIG. 3. FIG. 3 illustrates a diagram of the structure of the data E for transmission according to an embodiment of the present invention. The data under transmitted E in FIG. 3 uses the data structure of NPBCH as an example. However, the present invention is not limited thereto.

A transmission period of the data E is 640 milliseconds that correspond to 64 frames. Each group of 8 frames is an original data sub-block, in which one transmission period includes 8 original data sub-blocks SBO0~SB07. After the data V is generated by performing interleaving on the data D having the unit encoding length of 150 bits, the rate-matching is further performed on the data V so as to become 1600 bits. Each of the original data sub-blocks SBO0~SBO7 corresponds to 200 bits of such 1600 bits of data. The different frames within the same original data sub-blocks have different scrambling coding.

The received data RD that the data receiving apparatus 100 receives is corresponding to data E. However, the data receiving apparatus 100 does not know which one of the original data sub-blocks of data under transmitted E corresponds to the initial part of the received data. As a result, the blind deconvolution is required to be performed.

Reference is now made to FIG. 1 again. The components and operation of the data receiving apparatus 100 are described in the following paragraphs. As illustrated in FIG. 1, the data receiving apparatus 100 includes an antenna 110, a channel estimation circuit 120, an equalizing circuit 130, a descrambling circuit 140, a storage circuit 150, a soft-bit processing circuit 160 and a post-processing circuit 170.

The antenna 110 receives the received data RD through a wireless channel. The channel estimation circuit 120 and the equalizing circuit 130 are configured to perform channel estimation and equalization on the received data RD and transmit the estimated and equalized received data RD to the descrambling circuit 140.

The descrambling circuit 140 is configured to descramble the received data RD received from the antenna 110 according to an antenna assumption of the antenna 110 and N data position assumptions within a transmission period to generate N groups of soft-bit data. In an embodiment, each group of the N groups of soft-bit data is a log-likelihood ratio (LLR).

Each group of the N groups of soft-bit data includes N data sub-blocks within the transmission period. The N data position assumptions in turn assume that the first data sub-block of the received data RD is the first original data sub-block of original data to that the first data sub-block is the N-th original data sub-block of the original data.

Reference is now made to FIG. 4A. FIG. 4A illustrates different arrangements of the received data RD corresponding to different data position assumptions according to an embodiment of the present invention.

Corresponding to the embodiment of N having the value of 8 in FIG. 2, FIG. 4A illustrates 8 rows of the received data RD corresponding to 8 data position assumptions in turn being labeled as the 1st assumption to the 8th assumption. The received data RD includes 8 data sub-blocks SBD0~SBD7.

The 1st assumption that the first row corresponds to assumes that the first data sub-block SBD0 of the received data RD is the first original data sub-block SBO0 in FIG. 2. The 2nd assumption that the second row corresponds to assumes that the first data sub-block SBD0 of the received data RD is the second original data sub-block SBO1 in FIG. 2.

Based on the same rationale, the 8th assumption that the eighth row corresponds to assume that the first data sub-block SBD0 of the received data RD is the eighth original data sub-block SBD7 in FIG. 2.

When a transmission period finishes, the data receiving apparatus 100 receives the received data RD corresponding to a new transmission period. Therefore, for the 2nd assumption, the eighth data sub-block SBD7 of the received data RD in the second row corresponds to the first original data sub-block SBO0 of the next transmission period. For the 3rd assumption, the seventh and the eighth data sub-blocks SBD6 and SBD7 of the received data RD in the third row correspond to the first and the second original data sub-blocks SBO0 and SBO1 of the next transmission period.

Based on the same rationale, for the 8th assumption, the second data sub-block SBD1 to the eighth data sub-block SBD7 of the received data RD in the eighth row correspond to the first to the seventh original data sub-blocks SBO0 to SBD6 of the next transmission period. The sub-blocks assumed to be the original data sub-blocks of the next transmission period are illustrated as dashed line blocks so as to be distinguished from the sub-blocks assumed to be the original data sub-blocks of the current transmission period that are illustrated as solid line blocks.

Since each of the original data sub-blocks is scrambled differently, the descrambling circuit 140 descrambles received data RD according to the 8 data position assumptions to generate 8 groups of soft-bit data SD0~SD7.

Reference is now made to FIG. 4B. FIG. 4B illustrates a diagram of the soft-bit data SD0~SD7 according to an embodiment of the present invention.

Each group of the soft-bit data SD0~SD7 is generated according to the received data RD corresponding to one of the 8 data position assumptions in FIG. 4A. As illustrated in FIG. 4B, each group of the soft-bit data SD0~SD7 includes 8 deinterleaved soft-bit data sub-blocks DS0~DS7 each having a length of 200 bits.

Take the soft-bit data SD5 as an example, the data position assumption corresponding thereto is the 6th assumption in FIG. 4A. As a result, soft-bit data sub-block DS0 of the soft-bit data SD5 is assumed to be the sixth original data sub-block SBO5. The soft-bit data sub-blocks DS3~DS7 correspond to the first to the fifth original data sub-blocks SBO0~SB04 of the next transmission period and are illustrated as dashed line blocks. The other soft-bit data is structured in an identical manner and is not described herein.

Reference is now made to FIG. 1 again. The storage circuit 150 includes N circular buffers each having the unit encoding length. Corresponding to the embodiment of N having the value of 8 in FIG. 2, the storage circuit 150 includes 8 circular buffers RB0~RB7 each having the unit encoding length of 150 bits.

The soft-bit processing circuit 160 is configured to retrieve bit position information BP corresponding to the unit encoding length to determine a plurality of non-variable bit positions and a plurality of variable bit positions.

The bit position information BP is generated from the interleaving algorithm that the interleaving process in step S230 of FIG. 2 uses. Take the non-variable bit positions as an example, the bit position information BP may include the position information of the 66 non-variable bits of UnChangedPos_V, UnChangedPos_V+50 and UnChangedPos_V+100 described above.

In a embodiment, the data receiving apparatus 100 may include a calculation circuit (not illustrated in the figure) to perform calculation based on the interleaving algorithm to obtain the bit position information BP so as to be retrieved by the soft-bit processing circuit 160. In another embodiment, the data receiving apparatus 100 may include another storage circuit (not illustrated in the figure) to store the calculated bit position information BP so as to be retrieved by the soft-bit processing circuit 160. The present invention is not limited thereto.

The soft-bit processing circuit 160 is configured to perform blind deconvolution process. The blind deconvolution process uses the 8 circular buffers RB0~RB7 of the storage circuit 150 to store and superimpose the 8 groups of soft-bit data SD0~SD7 corresponding to 8 data position assumptions in a circular manner to generate 8 groups of superimposed results AR0~AR7.

Since each group of the soft-bit data SD0~SD7 is a LLR, the superimposed results AR0~AR7 are the combinations of these LLR information. The soft-bit processing circuit 160 further keeps the data corresponding to the non-variable bit positions in the N circular buffers and clears the data corresponding to the variable bit positions in the N circular buffers when a new assumed transmission period starts.

The soft-bit data SD5 and the circular buffer RB5 are used as an example to describe the process of circular storage and superimposition performed on the soft-bit data in the following paragraphs.

Reference is now made to FIG. 5A to FIG. 5D. FIG. 5A to FIG. 5D are diagrams respectively illustrate the soft-bit data SD5 and circular buffer RB5 according to an embodiment of the present invention.

The soft-bit data SD5 includes 8 groups of soft-bit data sub-blocks DS0~DS7 each having a length of 200 bits. The circular buffer RB5 is a buffer having a length of 150 bits.

Figure 5A:
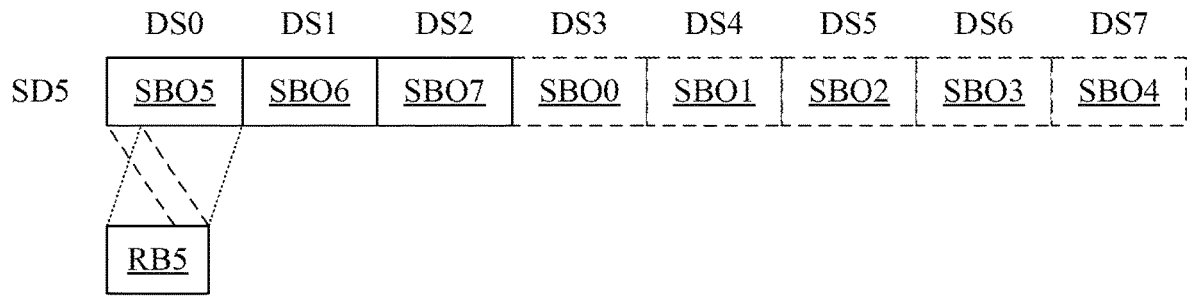
FIG. 5A to FIG. 5D are diagrams respectively illustrate the soft-bit data and circular buffer according to an embodiment of the present invention.

As illustrated in FIG. 5A, the circular buffer RB5 having the unit encoding length of 150 bits stores the first 50 bits of the first soft-bit data sub-block DS0 from the 101st bit position of the circular buffer RB5, and further stores and superimposes the last 150 bits of the soft-bit data sub-block DS0 from the beginning bit position of the circular buffer RB5 in the circular manner.

Figure 5B:
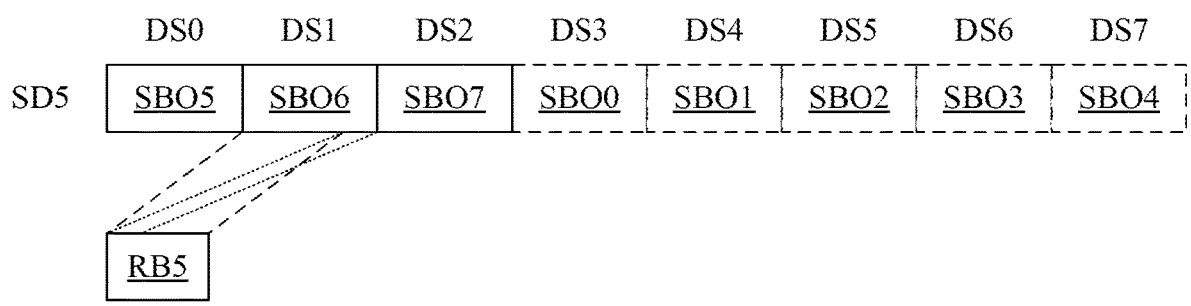

As illustrated in FIG. 5B, the circular buffer RB5 continues to store and superimpose the first 150 bits of the second group of the soft-bit data sub-block DS1 from the beginning bit position of the circular buffer RB5 in the circular manner, and further store and superimpose the last 50 bits of the soft-bit data sub-block DS1 from the beginning bit position of the circular buffer RB5 in the circular manner.

Figure 5C:
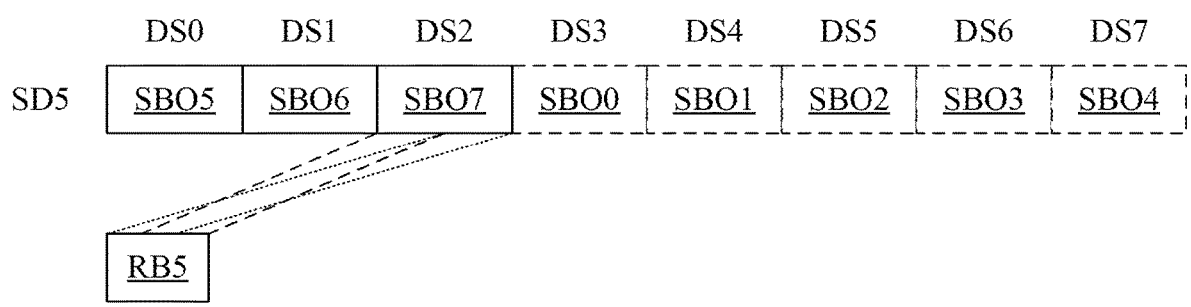

As illustrated in FIG. 5C, the circular buffer RB5 continues to store and superimpose the first 100 bits of the third group of the soft-bit data sub-block DS2 from the 51st bit position of the circular buffer RB5 in the circular manner, and further store and superimpose the last 100 bits of the soft-bit data sub-block DS2 from the beginning bit position of the circular buffer RB5 in the circular manner.

Figure 5D:
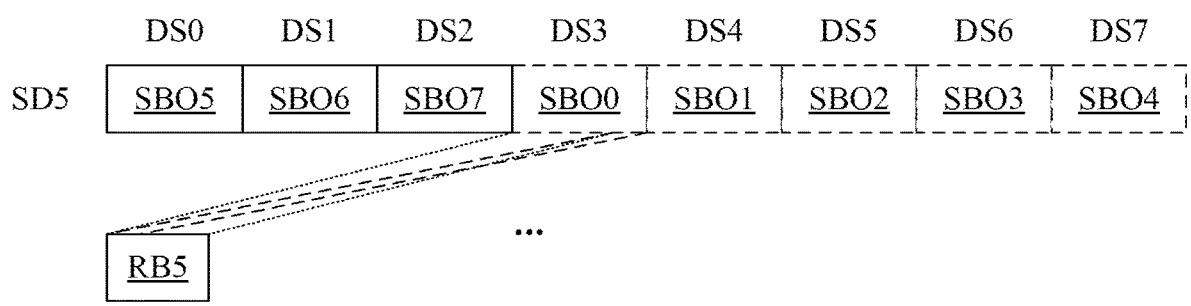

As illustrated in FIG. 5D, the next assumed transmission period begins. The blind deconvolution process keeps the data corresponding to the non-variable bit positions in the circular buffer RB5 and clears the data corresponding to the variable bit positions in the circular buffer RB5 when the new assumed transmission period starts.

Since the soft-bit data sub-block DS3 is the beginning of the new assumed transmission period of the soft-bit data SD5, the soft-bit data sub-block DS3 is stored from the beginning bit position of the circular buffer RB5. The circular buffer RB5 stores and superimposes the first 150 bits of the soft-bit data sub-block DS3 from the beginning bit position of the circular buffer RB5, further stores and superimposes the last 50 bits of the soft-bit data sub-block DS3 from the beginning bit position of the circular buffer RB5 in the circular manner. The subsequent soft-bit data sub-blocks DS4~DS7 can be stored and superimposed by the storage circuit 150 in the same manner. The detail is not described herein.

It is appreciated that since the soft-bit data SD5 corresponds to the 6th assumption and such an assumption assumes that the soft-bit data sub-block DS3 is the beginning of the next transmission period so as to clear the circular buffer RB5 when the soft-bit data sub-block DS3 begins. For the soft-bit data corresponding to other assumptions, the soft-bit data sub-block DS3 is not the beginning of the next transmission period. As a result, for the other assumptions, the circular buffer RB5 is not cleared when the soft-bit data sub-block DS3 begins. Instead, the circular buffer RB5 is cleared when the soft-bit data sub-block that corresponds to the start of the new transmission period in each of these other assumptions begins.

Reference is now made to FIG. 1 again. The post-processing circuit 170 includes a deinterleaving circuit 180, a decoding circuit 190 and a checking circuit 195.

The deinterleaving circuit 180 is configured to perform deinterleaving on the group of superimposed results AR0~AR7 of each of the data sub-blocks to generate N groups of deinterleaving results DI0~DI7. The decoding circuit 190 is configured to perform decoding on the N groups of deinterleaving results DI0~DI7 to generate N groups of the decoded results DO0~DO7.

The checking circuit 195 is configured to check the N groups of decoded results DO0~DO7 to generate and transmit the N checked results CR0~CR7 to the soft-bit processing circuit 160. The soft-bit processing circuit 160 determines whether the decoded results DO0~DO7 pass the redundancy check according to the checked results CR0~CR7.

When the checked results CR0~CR7 show that the N groups of decoded results DO do not pass the redundancy check, the soft-bit processing circuit 160 keeps performing the blind deconvolution process to superimpose the N groups of the soft-bit data by using the circular buffers. When the checked results CR0~CR7 show that any one group of the groups of the decoded results DO0~DO7 passes the redundancy check, the soft-bit processing circuit 160 finishes the blind deconvolution process. For example, when the decoded result DO5 passes the redundancy check, the soft-bit processing circuit 160 determines that the 6th assumption in FIG. 4A is correct and finishes the blind deconvolution process.

In different embodiments, the post-processing circuit 170 may use various methods to perform deinterleaving, decoding and redundancy checking. The present invention is not limited to certain deinterleaving, decoding and redundancy checking technology.

It is appreciated that the assumption of the single antenna 110 is used as an example in the embodiments described above. In an embodiment, when the antenna assumption assumes the number of the antenna to be M, the storage circuit 150 included by the data receiving apparatus 110 is M. The descrambling circuit 140 needs to perform descrambling on the M antennas assumed based on the antenna assumption and N data position assumptions to generate the groups of soft-bit data having a number of M×N. The soft-bit processing circuit 160 stores and superimposes the M×N soft-bit data in the circular manner by using the N circular buffers of each the M storage circuits to generate the M×N groups of superimposed results.

In some approaches, the soft-bit processing circuit clears all the information in the storage circuit when the new transmission period begins without combining the information in different time periods. Under such a condition, the blind deconvolution process requires more iterations to be finished.

The data receiving apparatus of the present invention performs blind deconvolution according to the information of the accumulated data corresponding to the non-variable bit positions to shorten the processing time of the blind deconvolution.

Reference is now made to Table 1 and Table 2. Table 1 and Table 2 respectively illustrate the number of iterations that the blind deconvolution is successfully performed respectively under the condition that the information in different periods is not combined (abbreviated as CN in Table 1 and Table 2) and the condition that the information in different periods is combined (abbreviated as CO in Table 1 and Table 2). Table 1 and Table 2 are the results of simulation performed under the condition that the antenna assumption assumes the number of the antenna to be 2, the channel type is ETU and Doppler Spread is 5 Hz.

Table 1 illustrates the minimum iteration number when 5% block error rate (BLER) is required to be accomplished. Table 2 illustrates the average iteration number when 5% block error rate (BLER) is required to be accomplished. Both the actual position of the initial frame of NPBCH in the transmission period having the length of 640 milliseconds and the signal-to-noise ratio (SNR) affect the efficiency.

TABLE 1

| SNR | Actual position | | | | | | | |
|---|---|---|---|---|---|---|---|---|
| | 0 | | 30 | | 40 | | 50 | |
| (dB) | CN | CO | CN | CO | CN | CO | CN | CO |
| −6 | 29 | 29 | 27 | 27 | 31 | 31 | 28 | 27 |
| −9 | 51 | 51 | 55 | 54 | 51 | 51 | 55 | 54 |
| −12 | 115 | 110 | 128 | 111 | 128 (BLER5.6%) | 114 | 127 | 122 |

TABLE 2

| SNR | Actual position | | | | | | | |
|---|---|---|---|---|---|---|---|---|
| | 0 | | 30 | | 40 | | 50 | |
| (dB) | CN | CO | CN | CO | CN | CO | CN | CO |
| −6 | 8.08 | 8.08 | 7.90 | 7.90 | 8.04 | 8.04 | 8.02 | 7.88 |
| −9 | 16.11 | 16.11 | 15.53 | 15.43 | 15.45 | 15.33 | 16.77 | 16.30 |
| −12 | 36.23 | 35.81 | 39.13 | 37.37 | 37.67 (BLER 5.6%) | 36.43 | 40.10 | 38.58 |

When the actual position is 40 and the SNR is −12 dB, even the largest iteration number is reached, the technology that does not combine the information in different periods can only reduce the BLER to 5.6%. According to Table 1, the technology that combines the information in different periods of the present invention has more obvious improvement when the SNR is lower. Under the condition of the high SNR, less iteration number is required to finish the blind deconvolution, which means it is harder to satisfy the criteria of performing the combination of the information over different periods. The actual position also affects the improvement since the probability of performing the combination of the information over different periods is different when the actual position is different. The ratio of the frame number in the history period is different as well. According to the condition in Table 1 and Table 2, comparing to the technology that the information in different time periods is not combined, the minimum iteration number required in the technology of the present invention decreases at most a dozen times and at least 0 time.

Comparing to the technology that the information in different time periods is not combined, the addition cost of the technology of the present invention is the memory space used to store the information of the non-variable bit positions. Under the low SNR condition, the minimum iteration number can be decreased at most a dozen times and the average iteration number can be decreased at most 1.76 times when 5% of BLER is accomplished. For the blind deconvolution process of NPBCH, when the number of the antenna is assumed to be 2 and the data position assumptions is 8, one iteration needs to perform calculation based on 16 assumptions. When one iteration is decreased, 16 times of decoding can be avoided.

Figure 6:
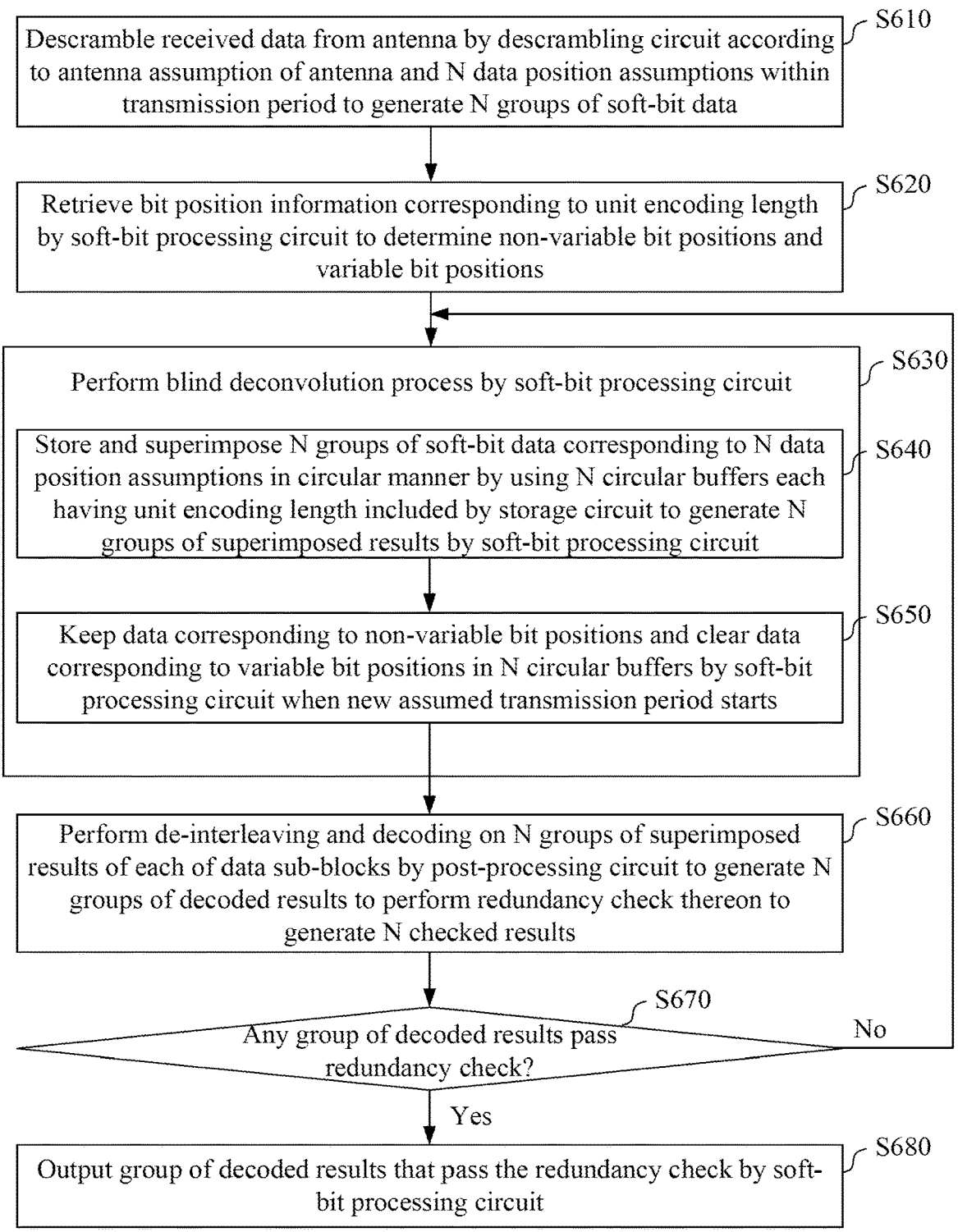
FIG. 6 illustrates a flow chart of a data receiving method having blind deconvolution mechanism according to an embodiment of the present invention.

FIG. 6 illustrates a flow chart of a data receiving method 600 having blind deconvolution mechanism according to an embodiment of the present invention.

Besides the apparatus described above, the present invention further discloses the data receiving method 600 that can be used in such as, but not limited to the data receiving apparatus 100 illustrated in FIG. 1. An embodiment of the data receiving method 600 is illustrated in FIG. 6 and includes the steps outlined below.

In step S610, the received data RD received from the antenna 110 is descrambled by the descrambling circuit 140 according to the antenna assumption of the antenna 110 and the N data position assumptions within the transmission period to generate the N groups of soft-bit data (e.g., the soft-bit data SD0~SD7).

In step S620, the bit position information BP corresponding to the unit encoding length is retrieved by the soft-bit processing circuit 160 to determine the non-variable bit positions and the variable bit positions.

In step S630, the blind deconvolution process is performed by the soft-bit processing circuit 160.

In step S640, the N groups of soft-bit data corresponding to the N data position assumptions are stored and superimposed in the circular manner by using the N circular buffers each having the unit encoding length included by the storage circuit 150 to generate the N groups of superimposed results (e.g., the superimposed results AR0~AR7) by the soft-bit processing circuit 160.

In step S650, the data corresponding to the non-variable bit positions is kept in the N circular buffers and the data corresponding to the variable bit positions in the N circular buffers is cleared by the soft-bit processing circuit 160 when the new assumed transmission period starts.

In step S660, de-interleaving and decoding are performed on the N groups of superimposed results of each of data sub-blocks by the post-processing circuit 170 to generate the N groups of decoded results (e.g., the decoded results DO0~DO7) to perform redundancy check thereon to generate N checked results (e.g., the checked results CR0~CR7).

In step S670, whether any one group of the decoded results pass the redundancy check is determined according to the N checked results.

When the N decoded results do not pass the redundancy check according to the N checked results, the flow goes back to step S630 such that the blind deconvolution process is kept being performed to superimpose the N groups of soft-bit data by using the N circular buffers by the soft-bit processing circuit 160.

In step S680, when any one group of the N groups of decoded results passes the redundancy check according to the N checked results, the group of decoded results that pass the redundancy check are outputted by the soft-bit processing circuit 160.

It is appreciated that the embodiments described above are merely an example. In other embodiments, it is appreciated that many modifications and changes may be made by those of ordinary skill in the art without departing, from the spirit of the invention.

In summary, the data receiving apparatus and the data receiving method having blind deconvolution mechanism of the present invention perform blind deconvolution according to the information of the accumulated data corresponding to the non-variable bit positions to shorten the processing time of the blind deconvolution.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A data receiving apparatus having blind deconvolution mechanism comprising:
    a descrambling circuit configured to descramble received data received from an antenna according to an antenna assumption of the antenna and N data position assumptions within a transmission period to generate N groups of soft-bit data, wherein the received data is generated according to a convolution encoding process and comprises N data sub-blocks within the transmission period, the N data position assumptions in turn assume that a first data sub-block of the received data is a first original data sub-block of original data to that the first data sub-block is an N-th original data sub-block of the original data;
    a storage circuit comprising N circular buffers each having a unit encoding length;
    a soft-bit processing circuit configured to retrieve bit position information corresponding to the unit encoding length to determine a plurality of non-variable bit positions and a plurality of variable bit positions to perform a blind deconvolution process comprising:
        storing and superimposing the N groups of soft-bit data corresponding to the N data position assumptions in a circular manner to generate N groups of superimposed results by the N circular buffers of the storage circuit; and
        determining that a new assumed transmission period starts to keeping data corresponding to the non-variable bit positions in the N circular buffers and clearing data corresponding to the variable bit positions in the N circular buffers; and
    a post-processing circuit configured to perform de-interleaving and decoding on the N groups of superimposed results of each of data sub-blocks to generate N groups of decoded results to perform redundancy check on the N groups of decoded results to generate N checked results;
    wherein the soft-bit processing circuit determines that any one group of the N groups of decoded results passes the redundancy check according to the N checked results to outputs the group of decoded results that pass the redundancy check.

2. The data receiving apparatus of claim 1, wherein the soft-bit processing circuit determines that the N groups of decoded results do not pass the redundancy check according to the N checked results to keeps performing the blind deconvolution process to superimpose the N groups of soft-bit data by using the N circular buffers.

3. The data receiving apparatus of claim 1, wherein each group of the N groups of soft-bit data is a log-likelihood ratio (LLR).

4. The data receiving apparatus of claim 1, wherein the antenna assumption assumes a number of the antenna to be M such that, a number of the storage circuits comprised by the data receiving apparatus is M, and the descrambling circuit performs descrambling on the M antennas assumed based on the antenna assumption and the N data position assumptions to generate the soft-bit data having a number of M×N, the soft-bit processing circuit stores and superimposes the M×N soft-bit data in the circular manner by using the N circular buffers of each the M storage circuits to generate the M×N groups of superimposed results.

5. The data receiving apparatus of claim 1, wherein the convolution encoding process comprises a check code attaching process, a channel encoding process, an interleaving process, a rate-matching process and a scrambling process performed by a data transmission apparatus that transmits the received data, and the bit position information is generated according to an interleaving algorithm of the interleaving process.

6. The data receiving apparatus of claim 1, wherein the post-processing circuit comprises:
    a deinterleaving circuit configured to perform deinterleaving on the group of superimposed results of each of the data sub-blocks to generate N groups of deinterleaving results;
    a decoding circuit configured to perform decoding on the N groups of deinterleaving results to generate N groups of the decoded results; and
    a checking circuit configured to check the N groups of decoded results to generate and transmit the N checked results to the soft-bit processing circuit.

7. The data receiving apparatus of claim 1, further comprising a channel estimation circuit and an equalizing circuit configured to perform channel estimation and equalization on the received data and transmit the estimated and equalized received data to the descrambling circuit.

8. The data receiving apparatus of claim 1, wherein a length of the transmission period is 640 milliseconds.

9. The data receiving apparatus of claim 8, wherein the length of the transmission period comprises the 8 data sub-blocks each having 200 bits and the unit encoding length is 150 bits.

10. A data receiving method having blind deconvolution mechanism used in a data receiving apparatus, comprising:
    descrambling received data received from an antenna by a descrambling circuit according to an antenna assumption of the antenna and N data position assumptions within a transmission period to generate N groups of soft-bit data, wherein the received data is generated according to a convolution encoding process and comprises N data sub-blocks within the transmission period, the N data position assumptions in turn assume that a first data sub-block of the received data is a first original data sub-block of original data to that the first data sub-block is an N-th original data sub-block of the original data;
    retrieving bit position information corresponding to the unit encoding length by a soft-bit processing circuit to determine a plurality of non-variable bit positions and a plurality of variable bit positions
    performing a blind deconvolution process by the soft-bit processing circuit that comprises:
        storing and superimposing the N groups of soft-bit data corresponding to the N data position assumptions in a circular manner by using N circular buffers each having a unit encoding length comprised by a storage circuit to generate N groups of superimposed results by the soft-bit processing circuit; and determining that a new assumed transmission period starts to keep data corresponding to the non-variable bit positions in the N circular buffers and clear data corresponding to the variable bit positions in the N circular buffers;

performing de-interleaving and decoding on the N groups of superimposed results of each of data sub-blocks by a post-processing circuit to generate N groups of decoded results to perform redundancy check on the N groups of decoded results to generate N checked results; and determining that any one group of the N groups of decoded results passes the redundancy check according to the N checked results to output the group of decoded results that pass the redundancy check by the soft-bit processing circuit.

11. The data receiving method of claim 10, further comprising:

determining that the N groups of decoded results do not pass the redundancy check according to the N checked results to keeps performing the blind deconvolution process to superimpose the N groups of soft-bit data by using the N circular buffers by the soft-bit processing circuit.

12. The data receiving method of claim 10, wherein each group of the N groups of soft-bit data is a log-likelihood ratio (LLR).

13. The data receiving method of claim 10, wherein the antenna assumption assumes a number of the antenna to be M such that a number of the storage circuits comprised by the data receiving apparatus is M, the data receiving method further comprises:

performing descrambling on the M antennas assumed based on the antenna assumption and the N data position assumptions by the descrambling circuit to generate the soft-bit data having a number of M×N; and storing and superimposing the M×N soft-bit data in the circular manner by using the N circular buffers of each of the M storage circuits by the soft-bit processing circuit to generate the M×N groups of superimposed results.

14. The data receiving method of claim 10, wherein the convolution encoding process comprises a check code attaching process, a channel encoding process, an interleaving process, a rate-matching process and a scrambling process performed by a data transmission apparatus that transmits the received data, and the bit position information is generated according to an interleaving algorithm of the interleaving process.

15. The data receiving method of claim 10, further comprising:

performing deinterleaving on the group of superimposed results of each of the data sub-blocks by a deinterleaving circuit comprised by the post-processing circuit to generate N groups of deinterleaving results;

performing decoding on the N groups of deinterleaving results by a decoding circuit comprised by the post-processing circuit to generate N groups of the decoded results; and checking the N groups of decoded results by a checking circuit comprised by the post-processing circuit to generate and transmit the N checked results to the soft-bit processing circuit.

16. The data receiving method of claim 10, further comprising:

performing channel estimation and equalization on the received data respectively by a channel estimation circuit and an equalizing circuit; and transmitting the estimated and equalized received data to the descrambling circuit.

17. The data receiving method of claim 10, wherein a length of the transmission period is 640 milliseconds.

18. The data receiving method of claim 17, wherein the length of the transmission period comprises the 8 data sub-blocks each having 200 bits and the unit encoding length is 150 bits.

* * * * *